(12) United States Patent
Antipa (10) Patent No.: US 7,177,423 B2
(45) Date of Patent: Feb. 13, 2007

(54) METHOD AND APPARATUS FOR EXPONENTIATION IN AN RSA CRYPTOSYSTEM

(75) Inventor: Adrian Antipa, Castlemore (CA)

(73) Assignee: Certicom Corp., Mississauga (CA)

( * ) Notice: Subject to any disclaimer, the term of this patent is extended or adjusted under 35 U.S.C. 154(b) by 398 days.

(21) Appl. No.: 10/863,162

(22) Filed: Jun. 9, 2004

(65) Prior Publication Data

US 2005/0063548 A1    Mar. 24, 2005

(51) Int. Cl.
   *H04L 9/00*    (2006.01)
(52) U.S. Cl. .......................... 380/28; 380/30; 380/277
(58) Field of Classification Search ................ 380/28, 380/30, 277
   See application file for complete search history.

(56) References Cited

OTHER PUBLICATIONS

Design methodology for Booth-encoded Montgomery module design for RSA cryptosystem; Jye-Jong Leu; An-Yeu Wu; Circuits and Systems, 2000. Proceedings. ISCAS 2000 Geneva. The 2000 IEEE International Symposium on vol. 5, May 28-31, 2000 pp. 357-360 vol. 5.*
Modified Montgomery modular multiplication and RSA exponentiation techniques; McIvor, C.; McLoone, M.; McCanny, J.V.; Computers and Digital Techniques, IEE Proceedings- vol. 151, Issue 6, Nov. 18, 2004 pp. 402-408.*
Fast architectures for FPGA-based implementation of RSA encryption algorithm; Nibouche, O.; Nibouche, M.; Bouridane, A.;
Belatreche, A.; Field-Programmable Technology, 2004. Proceedings. 2004 IEEE International Conference on 2004 pp. 271-278.*
Brumley, David & Boneh, Dan, "Remote Timing Attacks are Practical", preprint 2003, http://crypto.stanford.edu/~dabo/.
RSA Data Security Inc., *BSAFE A Crytographic Toolkit* User's Manual Version 4.0, 1995-1998, p. 99, RSA Data Security.
Kocher, Paul C., "Timing Attacks on Implementations of Diffie-Hellman, RSA, DSS, and Other Systems", *Advances in Cryptology—CRYPTO '96*, LNCS 1109, 1996, pp. 104-113, Springer-Verlag.
Schlindler, Werner, "A Timing Attack against RSA with the Chinese Remainder Theorem", *Cryptographic Hardware and Embedded Systems—CHES 2000*, LNCS 1965, pp. 109-124, Springer-Verlag, Berlin Heidelberg, 2000.

(Continued)

*Primary Examiner*—David Jung
(74) *Attorney, Agent, or Firm*—Blake, Cassels & Graydon; John R. S. Orange; Brett J. Slaney (57) ABSTRACT

A method of computing an exponent of a message m in an RSA cryptosystem having a private key d, a public key e and system parameters p, q where p and q are primes and ed=1 mod (p−1) (q−1). The method comprises the steps of obtaining a value r, and exponentiating the value r to the power e to obtain an exponent $r^e$ mod p, combining said exponent $r^e$ with the message m to obtain a combined value $r^e$ m and mod p; selecting a value s and obtaining a difference (d−s), exponentiating the combined value with said difference to obtain an intermediate exponent $(r^e m)^{d-s}$, multiplying the intermediate exponent by a value $m^s$ to obtain a resultant value equivalent to $r^{1-es} m^d$ and multiplying the resultant value by a value corresponding to $r^{1-es}$ to obtain an exponent corresponding to $m^d$ mod p.

5 Claims, 7 Drawing Sheets

OTHER PUBLICATIONS

Menezes, Alfred J., Van Oorschot, Paul C. & Vanstone, Scott A., *Handbook of Applied Cryptography*, 1997, pp. 600-603, CRC Press.

RSA Laboratories, *PKCS #1 v1.5: RSA Encryption Standard*, Nov. 1, 1993.

RSA Laboratories, *PKCS #1 v2.1: RSA Cryptography Standard*, Jun. 14, 2002.

RSA Press Release, 1995, http://islab.oregonstte.edu/documents/People/kocher/rsaga.txt.

* cited by examiner

METHOD AND APPARATUS FOR EXPONENTIATION IN AN RSA CRYPTOSYSTEM

FIELD OF THE INVENTION

The present invention relates to a method of cryptographic exponentiation for use with an RSA cryptosystem.

DESCRIPTION OF THE PRIOR ART

Many cryptographic algorithms involve calculations with secret values. Timing attacks on their implementations exploit the fact that certain steps in the algorithm take more time than others. These steps can be detected by carefully measuring the time required. In a paper entitled "Timing Attacks on Implementations of Diffie-Hellman, RSA, DSS, and Other System" in *Advances in Cryptology—CRYPTO '96*, Paul Kocher teaches timing attacks on several cryptographic schemes including RSA. Werner Schindler in a paper entitled "A timing attack against RSA with the Chinese Remainder Theorem," in *Cryptographic Hardware and Embedded Systems—CHES* 2000, teaches a specific timing attack discussed in more detail below, which is applicable to RSA-signatures. Recent work by David Brumley and Dan Boneh in a 2003 preprint entitled "Remote Timing Attacks are Practical" has shown such an attack to be practical in a networked environment.

In the well-known RSA scheme, computation is carried out modulo the product of two primes. The scheme, as currently practised, is taught in the industry standard PKCS #1 which may be found at http://www.rsasecurity.com/rsalabs/pkcs/pkcs-1/index.html. Key generation, decryption, and signature generation are summarized below.

RSA Key Generation (PKCS #1 v.1.5: RSA Encryption Standard, Section 6)

1. A positive integer e is chosen as the encrypting exponent, also known as the pubic exponent.
2. Two distinct odd primes p and q are randomly selected such that e is relatively prime to both p−1 and q−1.
3. The public modulus is the product n=pq.
4. The signing exponent d, also known as the private exponent, is chosen such that both p−1 and q−1 divide de−1.

With the above, the RSA operation on a quantity m with respect to an exponent k comprises raising m to the power k, modulo n, i.e. $m^k$ mod n.

RSA Decryption (PKCS #1 v1.5: RSA Encryption Standard, Section 9)

For this operation, a recipient has received encrypted data from a sender. The recipient has a public and private exponent pair and the sender has used the public exponent to encrypt the data.

1. Octet-string-to-integer conversation: The encrypted data is converted to an integer.
2. RSA computation: Perform the RSA operation on the integer from Step 1 above with respect to the private exponent. The result is an integer representing the decrypted data.
3. Integer-to-octet-string conversion: The integer result from Step 2 above is converted into an octet string.
4. Encryption-block parsing: The octet string from Step 3 above is parsed into a the zero octet, the block-structure identifier, the padding string, the zero octet, and the plain text. The values of the identifier and the padding string may be found in 8.1 of the referenced standard.

RSA Signing (PKCS #1 v1.5: RSA Encryption Standard, Section 9)

For this operation, the sender wishes to authenticate data using its private exponents so that the signature may be verified using its public exponent.

1. Message digesting: The message is digested with an appropriate message-digest function.
2. Data encoding: The message digest is encoded into an octet string via DER encoding
3. RSA computation: The octet string from Step 2 above is converted into an integer, the RSA operation is performed on said integer with respect to the private exponent, and the result converted to an octet-string.
4. Octet-string-to-bit-string conversion: The octet string from Step 3 above is converted into a bit-string. The resulting bit-string is defined to be the signature.

The use of the Chinese Remainder Theorem reduces the problem to computation modulo each prime. The primes are usually notated as p and q, so that n=pq. In the case of decrypting or signing a message in the RSA scheme, the bulk of computation is in the calculation of the following types of expressions.

$$m^d \bmod p \tag{1}$$

where d is a secret value, m is a message, and p is one of the primes. A similar computation is performed modulo the other prime q. The two computations are combined using the Chinese Remainder Theorem to obtain the result modulo n.

Those versed in the art reduce the computational load of exponentiation via the well-known method of Montgomery Reduction (as described Section 14.3.2 of the, *Handbook of Applied Cryptography* by Alfred J. Menezes, Paul C. van Oorschot and Scott A. Vanstone, for example). The method comprises converting numbers into so-called Montgomery Form, performing calculations with said forms, and then converting the result back to regular numbers. Calculations in Montgomery Form are very efficient. In practical RSA implementations, the savings from the reduced computations in Montgomery Form more than compensate for the costs of conversion.

At the end of each multiplication in Montgomery Reduction, a step called an, extra reduction may be required. Schindler showed that the probability of an extra reduction, which is detectable with timing measurements, in the calculation of an expression in Equation 1 is proportional to the proximity of m to p:

$$Pr\ [\text{Extra Reduction}] = \frac{m \bmod p}{2R} \tag{2}$$

where R is the Montgomery multiplier used in Montgomery Reduction. In particular, the number of extra reductions increases as m approaches p from below and dramatically drops at multiples of p. Thus by varying m, one can deduce the value of p based on timing differences.

Deducing the primes is tantamount to breaking the system. Blinding techniques are remedies in which the message m is modified by a value unknown to an attacker before the exponentiation and then adjusted after the exponentiation to retrieve the correct value. (RSA Security recommended the use of blinding techniques in a press release of 1995. The recommendation of blinding may also be found in the Version 4.2 of the manual of RSA Security's product.) In all of these references, the recommendation is to multiply the message m by a so-called blinding value, $r^e$, where r is randomly generated and e is the RSA encryption exponent. The calculation of Equation 1 is then carried out with $\tilde{m}=r^e m$ (via Montgomery Reduction). Because r is random, timing the absence or presence of an extra reduction will only reveal the proximity of $\tilde{m}$ to the prime and not reveal information on the proximity of m to the prime. Unfortunately, the end result of the decryption calculation is $(\tilde{m})^d = rm \bmod p$ and one must divide by r to obtain the correct result.

It is an object of the present invention to obviate or mitigate some of the above disadvantages.

SUMMARY OF THE INVENTION

The inventor has recognized a way to blind exponentiation that avoids an inversion and reduces storage requirements.

A blinding value is chosen and m is modified using the blinding value. After exponentiation, the correct value $m^d \bmod p$ is recovered.

Four multiplications, one exponentiation, and one accumulator are required in one embodiment.

In a preferred embodiment, three multiplications, two exponentiations and two accumulators are required.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
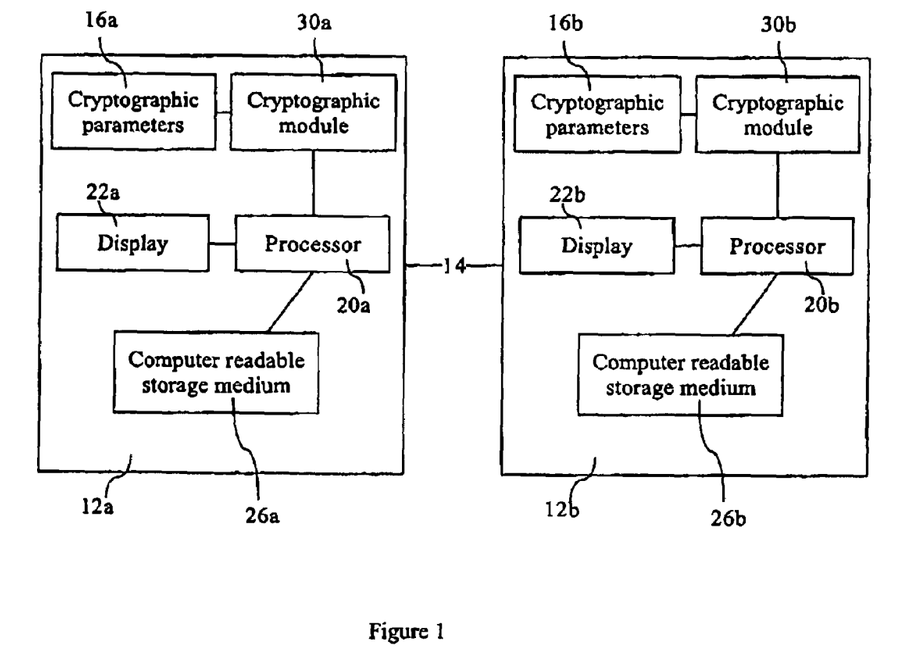
FIG. 1 is a schematic representation of a communication system.

Referring to FIG. 1, a communication system 10 includes a pair of correspondents 12a, 12b connected by a communication channel 14. The correspondents 12a and 12b are configured to communicate securely over the communication channel 14 through the use of cryptographic protocols based on the RSA system, Each correspondent 12a, 12b includes respective cryptographic parameters 16a, 16b, which may include public and/or private keys, an RSA modulus, and various other information related to RSA cryptographic systems. The information required may vary depending on the protocol. To simplify the description of the following applications, the private key of correspondent 12a is denoted as d and the public key of correspondent 12b is denoted as e. Correspondent 12b has access to the public key e in its cryptographic parameters 16b. It is recognized that the correspondent 12b may have its own public key and private key pair. The correspondent 12a also has additional cryptographic parameters 16a which include a modulus n which is the product of two primes p and q. The values of the two prunes p and q are maintained secret by the correspondent 12a. The private key d and the public key e satisfy $ed \equiv 1 \bmod (p-1)(q-1)$. As a result of this relationship, exponentiation by the private key d and public key e are inverse operations modulo n.

The protocols performed by the correspondents 12a, 12b may allow the correspondents 12a, 12b to sign messages to verify their identity, encrypt messages to thwart an eavesdropper, or a combination of the two. Various other cryptographic protocols may be used by the correspondents 12a, 12b to accomplish other cryptographic goals. The correspondents 12a, 12b may take various forms including smart cards, desktop computers, laptop computers, wireless devices such as cellular telephones and pagers and the like.

Each correspondent 12a, 12b can include a respective processor 20a, 20b. Each processor 20a, 20b is coupled to a respective display 22a, 22b and to user input devices 24a, 24b, such as a keyboard, mouse, or other suitable devices. If the display 22a, 22b is touch sensitive, then the display 22a, 22b itself can be employed as the user input device 24a, 24b. In some applications, the display 22a, 22b is not necessary for the functioning of the correspondents 12a, 12b and an alternative interface may be provided.

A computer readable storage medium 26a, 26b is coupled to each processor 20a, 20b for providing instructions to the processor 20a, 20b to instruct and/or configure processor 20a, 20b to perform steps or algorithms related to cryptographic operations performed by the correspondents 12a, 12b, as further explained below. The computer readable medium 26a, 26b can include hardware and/or software such as, by way of example only, magnetic disks, magnetic tape, optically readable medium such as CD ROM, and semi-conductor memory such as PCMCIA cards. In each case, the medium 26a, 26b may take the form of a portable item such as a small disk, floppy diskette, cassette, or it may take the form of a relatively large or immobile item such as hard disk drive, solid state memory card, or RAM. It should be noted that the above listed example mediums 26a, 26b can be used either alone or in combination.

Each correspondent 12a, 12b includes a cryptographic module 30a, 30b which may be implemented on the respective processor 20a, 20b by software instructions in the respective medium 26a, 26b. Alternatively, the cryptographic module 30a, 30b could be a hardware component, or a special-purpose processor.

Figure 2:
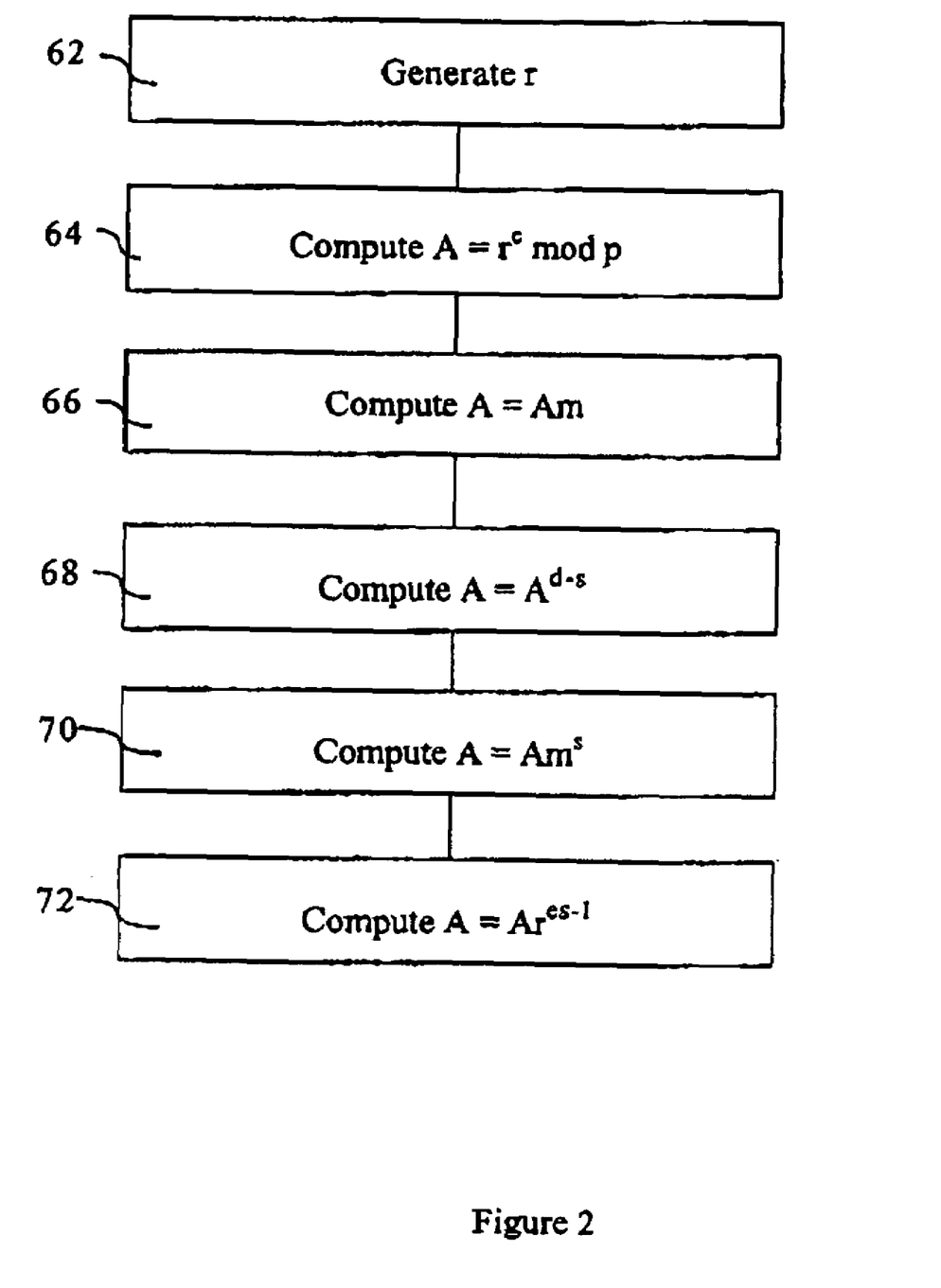
FIG. 2 is a flowchart of an exponentiation method.

During operations performed by the correspondents 12a, 12b a method of exponentiation is used to blind exponentiations without requiring an inversion operation. Referring to FIG. 2, the steps used to exponentiate a value M to an exponent d modulo a prime p are shown generally by the numeral 60. The method uses a modular accumulator A which performs operations modulo the prime p. Subscripts on A are used to denote the value of A at each step in the method. It will be understood that the method is preferably implemented with one accumulator and that the various subscripts indicate the value of the one accumulator after each step of the method.

First, a value r is randomly generated at step 62 and stored in the modular accumulator A as the value $A_0$. Then the value $A=r^e \bmod p$ is calculated at step 64 by exponentiating the accumulator A by the value e to store $A_1$ in the accumulator. The accumulator performs the reduction modulo p automatically. Then the accumulator A is multiplied by the message m at step 66 to obtain $A_2$. Again, the value in the accumulator is implicitly reduced modulo p. A value s is chosen that is preferably a small number and may even be 1 and at step 68 the accumulator A is exponentiated by a value d−s, that is the difference between the private key d and the value s, to obtain $A_3$. Then the accumulator is multiplied by the value $m^s$, that is the message m exponentiated by the value s, to obtain $A_4$. Finally, the accumulator is multiplied by $r^{es-1}$, that is the random value r exponentiated to a value one less than the product of the public key e and the value s to obtain the value $A_5$. After these operations, the accumulator A holds the value of $m^d$, that is the message m exponentiated by the secret value d. This is true because the value of the accumulator A changes as follows, with all computations modulo p:

$$A_1 = r^e$$

$$A_2 = r^e m$$

$$A_3 = (r^e m)^{d-s} = r^{ed-es} m^{d-s} = r^{1-es} m^{d-s}$$

$$A_4 = r^{1-es} m^d$$

$$A_5 = m^d$$

The value r used in this embodiment should be nonconstant and unknown to the attacker. One method of obtaining such a value is to use a random source.

If a random source is not readily accessible or is computationally expensive, a value r may be computed by mixing a quantity unknown to the attacker (such a p) with a variable quantity (such as m) and then hashing the result, thus forcing the attacker to work against itself. The value r may be obtained as follows.

First fold p and the message m via the "exclusive-or" operation XOR, padding the shorter out to the same bit length as the longer by adding zeroes. Choose r to be a secure hash of the resulting mixture. The secure hash is preferably SHA-1, but may be any other cryptographically secure hash function as will be understood by those skilled in the art.

If hashing the entire message is a computationally expensive operation, the mixture can be reduced to a single hash-sized block by folding one block into the next block, starting with the most significant block (suitably padded out with zeroes if needed) and continuing down to the least significant block. The final block is then hashed and the resulting value used for r. In general, a suitable hash function may be applied to the message.

The exponentiation method of this embodiment may be summarized as follows:

Blinding without inversion
(using p-modular accumulator A)

| Step | | Contents of A |
|---|---|---|
| 0. | Generate random r. | |
| 1. | $A := r^e$ | $r^e$ |
| 2. | $A := A \cdot m$. | $r^e m$ |
| 3. | $A := A^{d-s}$. | $(r^e m)^{d-s} = r^{ed-es} m^{d-s} = r^{1-es} m^{d-s}$ |
| 4. | $A := A \cdot m^s$. | $r^{1-es} m^d$ |
| 5. | $A := A \cdot r^{es-1}$ | $m^d$ |

Figure 3:
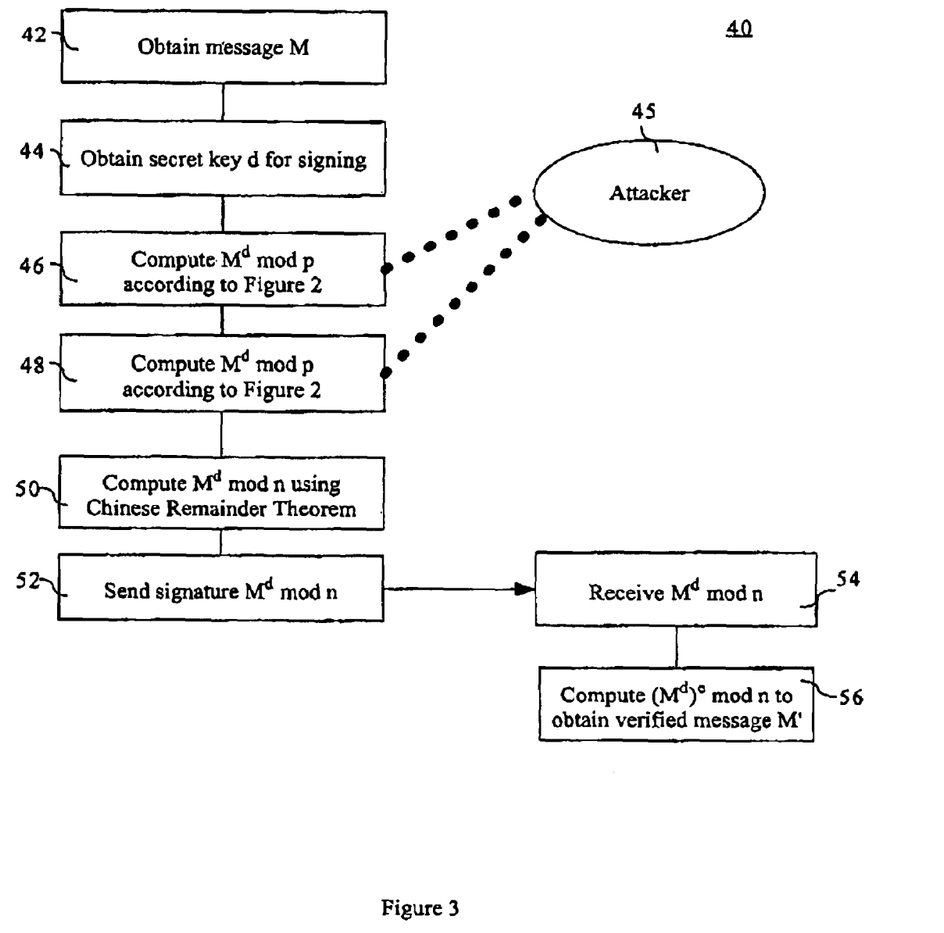
FIG. 3 is a flowchart of a signature protocol performed by a pair of correspondents in the communication system of FIG. 1 which uses the method of FIG. 2.

Referring to FIG. 3, an example of the main steps of a signature protocol is shown generally by the numeral 40. This protocol contemplates an attacker 45 monitoring exponentiation operations performed by one of the correspondents 12a. It will be understood that the presence of the attacker 45 is presumed for security purposes when implementing the protocol, but that in normal use, the attacker 45 will not be present.

The first correspondent 12a obtains a message M at step 42 which it would like to sign and send to the second correspondent 12b. The first correspondent then obtain the private key d which is used to sign messages from its cryptographic parameters 16a. The first correspondent performs an exponentiation operation on M to obtain $v_1 = M^d$ mod p at step 46 using the method described above with reference to FIG. 2 with the accumulator A performing computations modulo p. The first correspondent performs another exponentiation operation on M to obtain $v_2 = M^d$ mod q at step 48 using the method described above with reference to FIG. 2 with the accumulator A performing operations modulo q.

At step 50, the first correspondent computes $M^d$ mod n using the Chinese Remainder Theorem. Various methods to perform the Chinese Remainder Theorem computation may be used. For example, Garner's Algorithm which is described in Section 14.5.2 of the Handbook of Applied Cryptography, CRC Press, 1997. One particularly efficient method is to compute $C_2 = p^{-1}$ mod q, then $u = (v_2 - v_1)C_2$ mod q and finally $x = v_1 + up$. The value of x is then $M^d$ mod n.

The correspondent 12a sends the signature to the second correspondent 12b at step 52, which the second correspondent 12b receives at step 54. The second correspondent performs a reverse operation at step 56 by exponentiating the signature with e, the first correspondent's public key. This computation results in a verified message M' at step 48, which verifies the signature.

It is recognized that in practical implementations of such signature protocols, various refinements are made for security and efficiency reasons as described in various standards such as PKCS #1, as will be understood by those skilled in the art.

Figure 4:
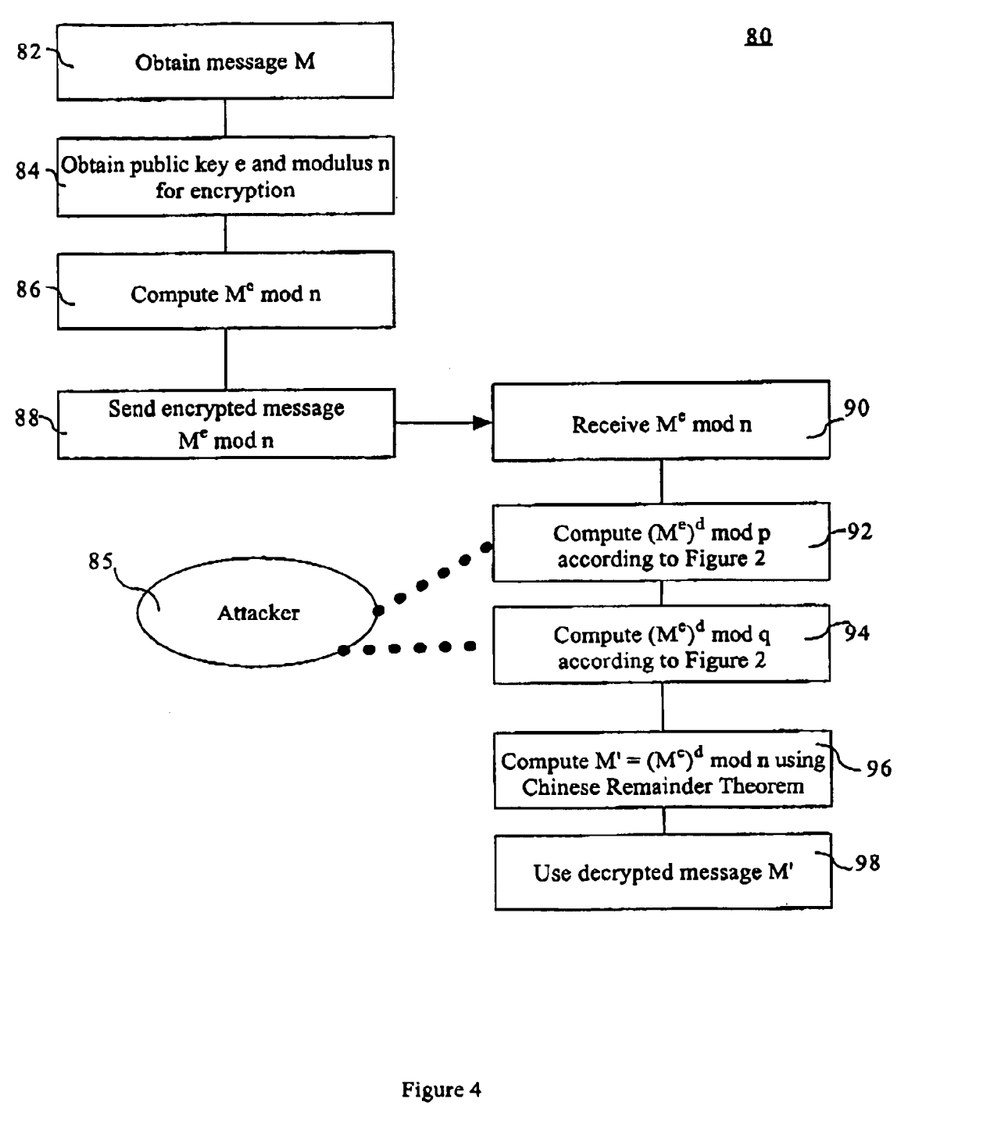
FIG. 4 is a flowchart of an encryption protocol performed by a pair of correspondents in the communication system of FIG. 1 which uses the method of FIG. 2.

In another embodiment, the exponentiation method of FIG. 2 in used in a decryption method shown generally in FIG. 4 by the numeral 80. This protocol contemplates an attacker 85 monitoring exponentiation operations performed by the second correspondent 12b. It will be understood that the presence of the attacker 85 is presumed for security purposes when implementing the protocol, but that in normal use, the attacker 85 will not be present.

The first correspondent 12a first obtains a message M at step 82. Then, the first correspondent 12a obtains the public key e and modulus n of the second correspondent 12b for encrypting message. The first correspondent 12a computes an exponentiation of M by e modulo n. The first correspondent then sends the encrypted message $M^e$ mod n to the second correspondent at step 88. The second correspondent receives the encrypted message at step 90. The second correspondent 12b then exponentiates the encrypted message by the private key d modulo p using the method of FIG. 2 at step 92. The second correspondent 12b then similarly exponentiates the encrypted message by the private key d modulo q using the method of FIG. 2 at step 94. Then the second correspondent 12b computes the decrypted message M' modulo n using the Chinese Remainder Theorem at step 96. It will be understood by those skilled in the art that various methods of using the Chinese Remainder Theorem are possible, such as those described above with respect to FIG. 3. The correspondent 12b may then use the decrypted message M' at step 98.

It is recognized that in practical implementations of such encryption protocols, various refinements are made for security and efficiency reasons as described in various standards including PKCS #1 as will be understood by those skilled in the art.

Further embodiments of the exponentiation method of FIG. 2 will now be described. It will be understood by those skilled in the art that these exponentiation methods may be used in any RSA system, and in particular, in the applications of FIGS. 3 and 4 above.

Figure 5:
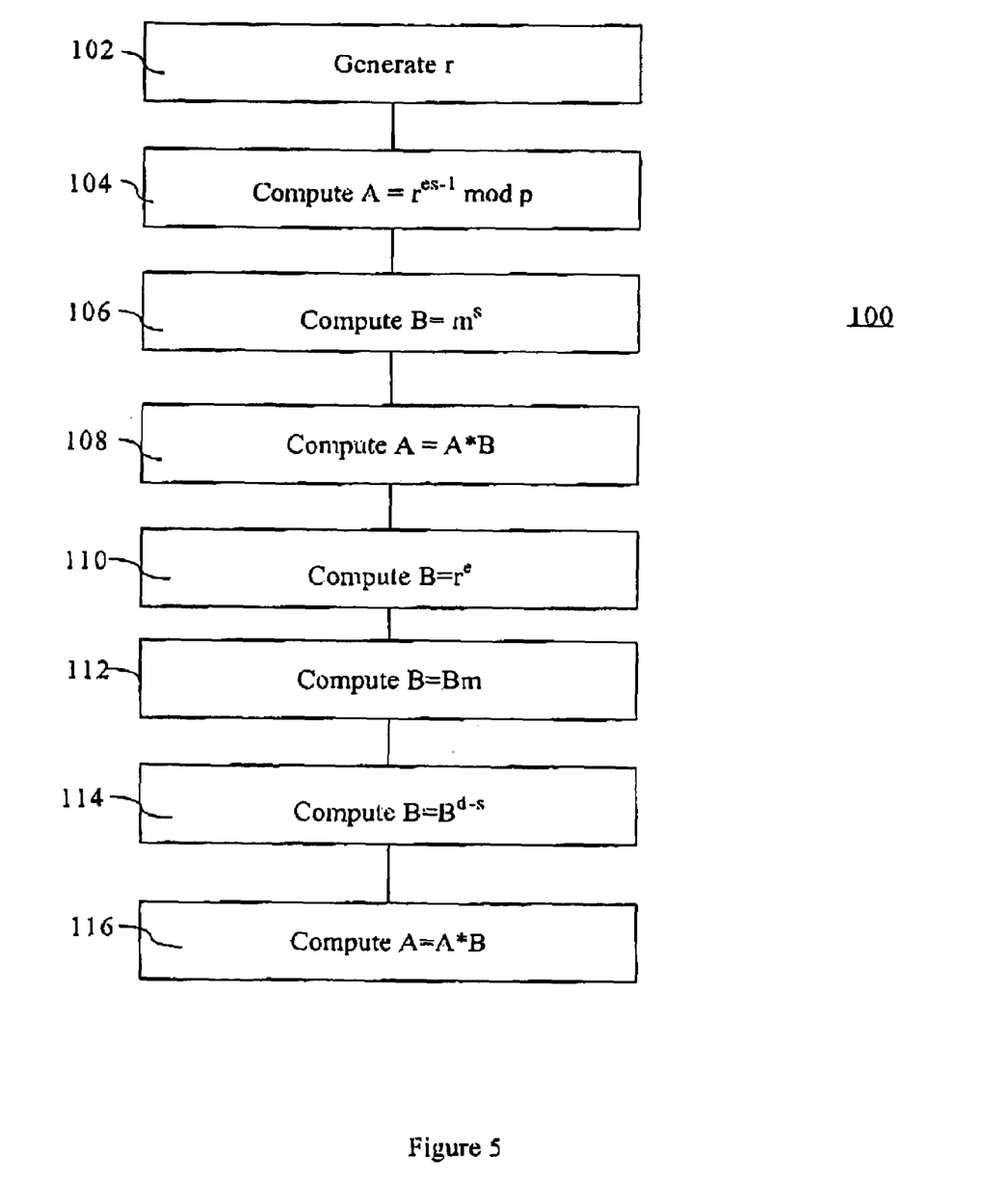
FIG. 5 is a flowchart of another embodiment of an exponentiation method.

Referring therefore to FIG. 5, a further embodiment of exponentiations shown generally by the numeral 100. In this embodiment, two modular accumulators A and B are used, which each perform computations modulo the prime p. First a random value r is generated at step 102. Then a value $A = r^{es-1}$ mod p is computed at step 104 in the accumulator A by exponentiating the random value r to a value one less than the product of the public key e and a parameter s. The accumulator A implicitly reduces the value modulo p. At step 106, a value $B = m^s$ is computed in the accumulator B by exponentiating the value m by the parameter s and implicitly reducing modulo p. Then the accumulators A and B are multiplied and the result is stored in the accumulator A at step 108. At step 110, a value $B = r^e$ is stored in the accumulator B by exponentiating the random value r to the public key e. The accumulator B is then multiplied by the message m at step 112. Then at step 114 the accumulator B is exponentiated to the value d−s, that is the difference between the private key d and the parameter s. Finally, the accumulators A and B are multiplied at step 116 to obtain the value of $m^d$ mod p. The values of the accumulators in this embodiment may be summarized as follows:

| | Blinding without inversion (using p-modular accumulators A, B) | | |
|---|---|---|---|
| | | Accumulator Contents | |
| Step | | A | B |
| 0. | Generate random r | | |
| 1. | $A := r^{es-1}$ | $r^{es-1}$ | |
| 2. | $B := m^s$ | | $m^s$ |
| 3. | $A := A \cdot B$ | $r^{es-1} m^s$ | |
| 4. | $B := r^e$ | | $r^e$ |
| 5. | $B := B \cdot m$ | | $r^e m$ |
| 6. | $B := B^{d-s}$ | | $(r^e m)^{d-s}$ |
| | | | $= r^{ed-es} m^{d-s}$ |
| | | | $= r^{1-es} m^{d-s}$ |
| 7. | $A := A \cdot B$ | $m^d$ | |
| 8. | Return A | | |

Figure 6:
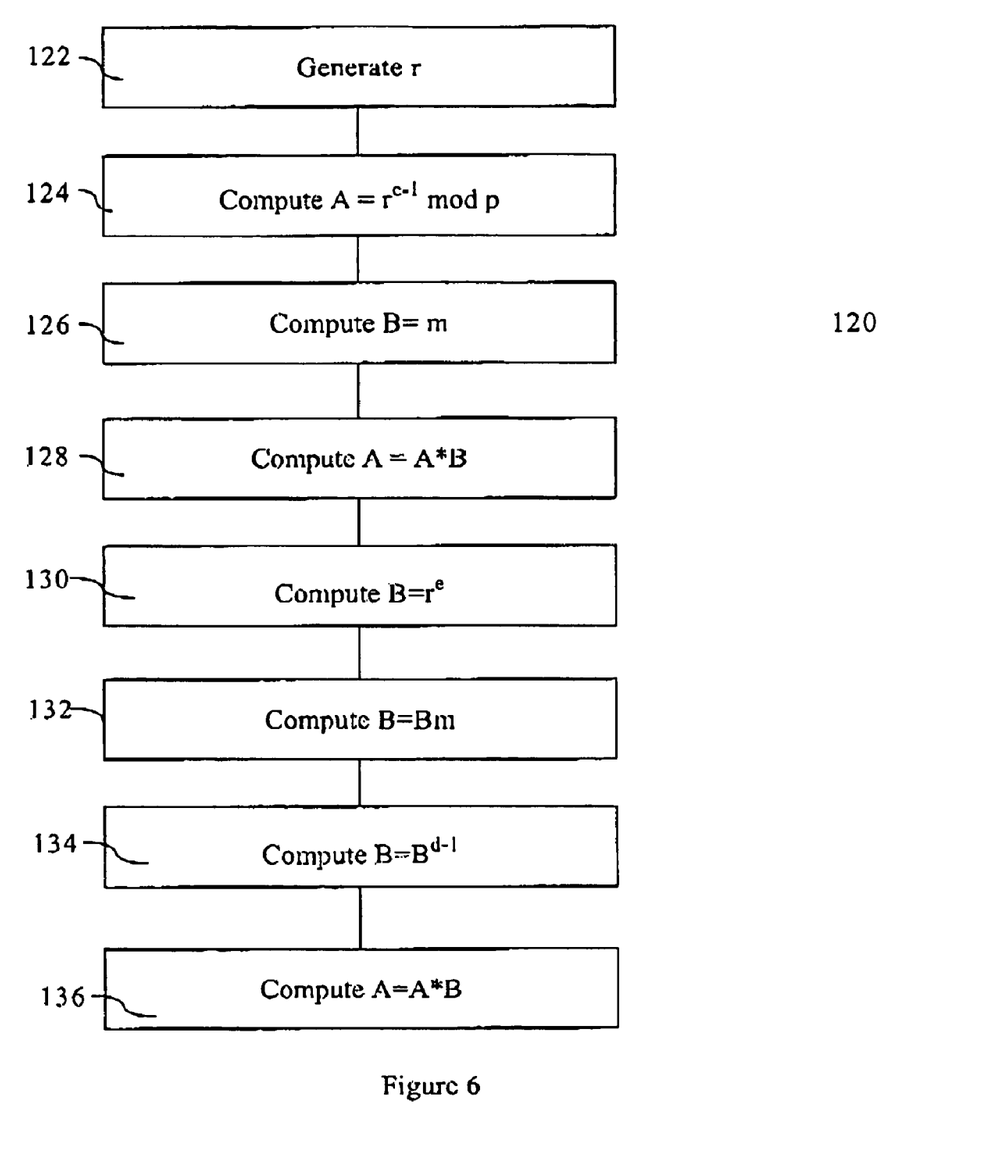
FIG. 6 is a flowchart of yet another embodiment of an exponentiation method.

Referring to FIG. 6, a further embodiment is shown generally by the numeral 120. In this embodiment, the value s is made equal to 1. First a random value r is generated at step 122. Then a value $A = r^{e-1}$ mod p is computed at step 124 in the accumulator A by exponentiating the random value r to a value one less than the public key e. The accumulator A implicitly reduces the value modulo p. At step 126, the value m is stored in the accumulator B. Then the accumulators A and B are multiplied and the result is stored in the accumulator A at step 128. At step 130, a value $B = r^e$ is stored in the accumulator B by exponentiating the random value r to the public key e. The accumulator B is them multiplied by the message m at step 132. Then at step 134 the accumulator B is exponentiated to the value d−1, that is a value one less than the private key d. Finally, the accumulators A and B are multiplied at step 136 to obtain the value of $m^d$ mod p.

This values of the accumulators in this embodiment may be summarized as follows:

| | Blinding without inversion preferred embodiment (using p-modular accumulators A, B) | | |
|---|---|---|---|
| | | Accumulator Contents | |
| Step | | A | B |
| 0. | Generate random r | | |
| 1. | $A := r^{e-1}$ | $r^{e-1}$ | |
| 2. | $B := m$ | | m |
| 3. | $A := A \cdot B$ | $r^{e-1} m$ | |
| 4. | $B := r^e$ | | $r^e$ |
| 5. | $B := B \cdot m$ | | $r^e m$ |
| 6. | $B := B^{d-1}$ | | $(r^e m)^{d-1}$ |
| | | | $= r^{ed-e} m^{d-1}$ |
| | | | $= r^{1-e} m^{d-1}$ |
| 7. | $A := A \cdot B$ | $m^d$ | |
| 8. | Return A | | |

Figure 7:
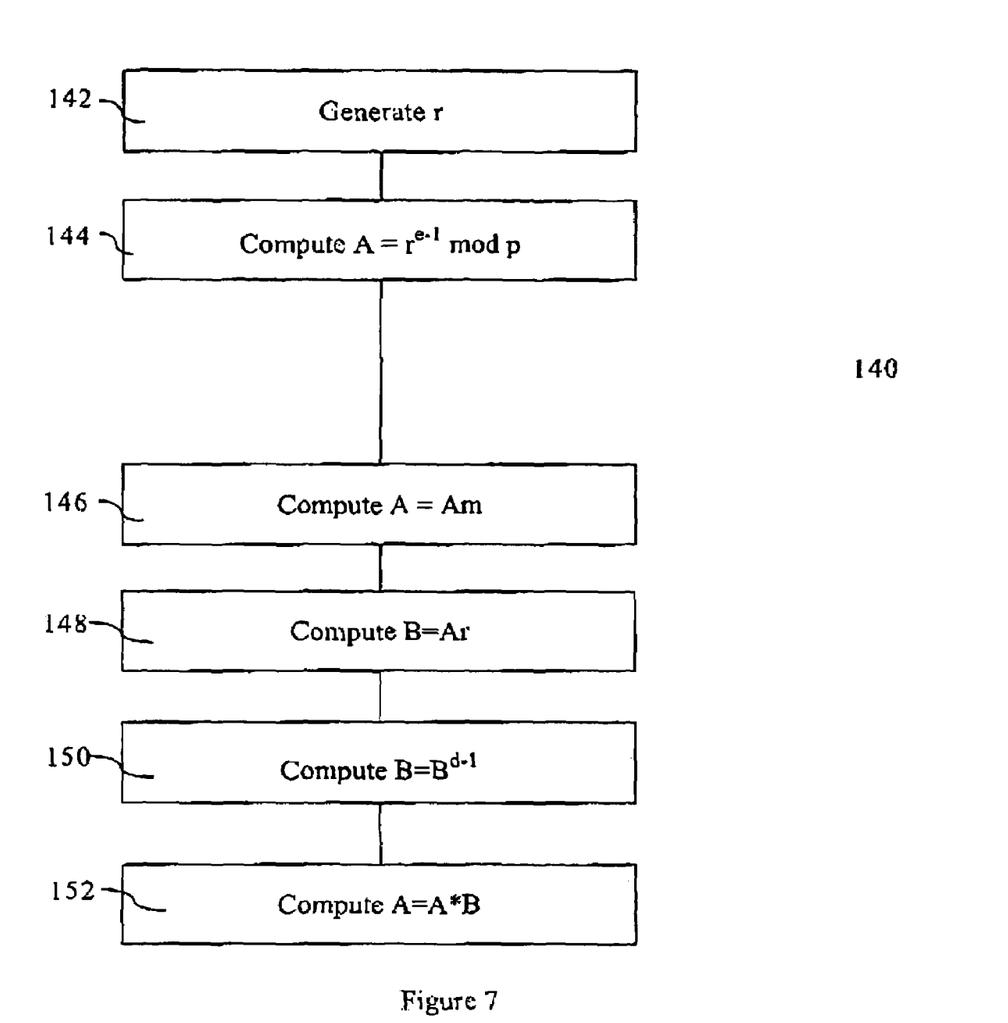
FIG. 7 is a flowchart of a further embodiment of an exponentiation method.

Referring to FIG. 7, yet another embodiment is shown generally by the numeral 140 This embodiment is related to the embodiment of FIG. 6 in that steps 124, 126 have been consolidated and the steps 130 and 132 have been combined. First a random value r is generated at step 142. Then a value $A = r^{e-1}$ mod p is computed at step 144 in the accumulator A by exponentiating the random value r to a value one less than the public key e. The accumulator A implicitly reduces the value modulo p. At step 146, the accumulator A is multiplied by the value m and the result (modulo p) is stored in the accumulator A. Then a value $B = Ar$ is stored in the accumulator B by multiplying the value of the accumulator A by the random value r at step 148. Then at step 150 the accumulator B is exponentiated to the value d−1, that is a value one less than the private key d. Finally, the accumulators A and B are multiplied at step 152 to obtain the value of $m^d$ mod p.

The values of the accumulators in this embodiment may be summarized as follows:

| | Blinding without inversion optimized preferred embodiment (using p-modular accumulators A, B) | | |
|---|---|---|---|
| | | Accumulator Contents | |
| Step | | A | B |
| 0. | Generate random r | | |
| 1. | $A := r^{e-1}$ | $r^{e-1}$ | |
| 2. | $A := A \cdot m$ | $r^{e-1} m$ | |
| 3. | $B := A \cdot r$ | | $r^e m$ |
| 4. | $B := B^{d-1}$ | | $(r^e m)^{d-1}$ |
| | | | $= r^{ed-e} m^{d-1}$ |
| | | | $= r^{1-e} m^{d-1}$ |
| 5. | $A := A \cdot B$ | $m^d$ | |
| 6. | Return A | | |

Although the invention has been described with reference to certain specific embodiments, various modifications thereof will be apparent to those skilled in the art without departing from the spirit and scope of the invention as outlined in the claims appended hereto.

What is claimed is:

1. A method of computing an exponent of a message m in an RSA cryptosystem having a private key d, a public key e and system parameters p, q where p and q are primes and ed=1 mod (p−1) (q−1), said method comprising the steps of obtaining a value r, and exponentiating said value r to the power e to obtain an exponent $r^e$ mod p, combining said exponent $r^e$ with said message m to obtain a combined value $r^e$ m and mod p; selecting a value s and obtaining a difference (d−s), exponentiating said combined value with said difference to obtain an intermediate exponent $(r^e m)^{d-s}$, multiplying said intermediate exponent by a value $m^s$ to obtain a resultant value equivalent to $r^{1-es} m^d$ and multiplying said resultant value by a value corresponding to $r^{1-es}$ to obtain an exponent corresponding to $m^d$ mod p.

2. A method according to claim 1 wherein said value r is obtained from a random source.

3. A method according to claim 1 wherein said value r is obtained by combining a secret value and a variable value.

4. A method according to claim 3 wherein said secret value is one p of said primes and said variable value is derived from said message.

5. A method according to claim 4 wherein said secret value and variable value are hashed by a secure hash function to obtain said value r.

* * * * *